United States Patent
Nigul et al.

(10) Patent No.: US 10,133,563 B2
(45) Date of Patent: Nov. 20, 2018

(54) DEPLOYED IMAGE MONITORING AND RELEVANT CHANGE DETECTION

(71) Applicant: International Business Machines Corporation, Armonk, NY (US)

(72) Inventors: Leho Nigul, Richmond Hill (CA); Basalingayya G. Salimath, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 95 days.

(21) Appl. No.: 14/834,486

(22) Filed: Aug. 25, 2015

(65) Prior Publication Data

US 2017/0060556 A1    Mar. 2, 2017

(51) Int. Cl.
*G06F 8/60* (2018.01)
*G06F 8/61* (2018.01)
*G06F 8/65* (2018.01)

(52) U.S. Cl.
CPC .............. *G06F 8/60* (2013.01); *G06F 8/63* (2013.01); *G06F 8/65* (2013.01)

(58) Field of Classification Search
CPC .............. G06F 8/60; G06F 8/63; G06F 8/65
USPC .................................... 717/168, 174
See application file for complete search history.

(56) References Cited

U.S. PATENT DOCUMENTS

| | | | |
|---|---|---|---|
| 7,401,054 B1 * | 7/2008 | Shah ................... | G06F 21/6227 705/51 |
| 8,145,940 B1 | 3/2012 | Wang et al. | |
| 8,387,037 B2 | 2/2013 | Henseler et al. | |
| 2004/0194079 A1 * | 9/2004 | Nguyen ................ | G06F 8/65 717/168 |
| 2004/0198496 A1 * | 10/2004 | Gatto ..................... | A63F 13/12 463/42 |
| 2007/0046791 A1 | 3/2007 | Wang et al. | |
| 2010/0205594 A1 * | 8/2010 | Jirka ........................ | G06F 8/63 717/170 |
| 2014/0172491 A1 | 6/2014 | Karve et al. | |
| 2014/0325510 A1 | 10/2014 | Bolte et al. | |

\* cited by examiner

*Primary Examiner* — Anna C Deng
(74) *Attorney, Agent, or Firm* — James H. Mayfield; William H. Hartwell (57) ABSTRACT

As disclosed herein a method, executed by a computer, includes receiving, from a monitoring agent, a notification that an artifact corresponding to a deployed software image has been modified or the artifact has been referenced by a support application, and determining if the artifact is a relevant artifact and should be preserved. The method further includes determining an action corresponding to the relevant artifact to provide an identified action, and performing, prior to deploying a new software image, the identified action. A computer system, and a computer program product corresponding to the above method are also disclosed herein.

11 Claims, 4 Drawing Sheets

DEPLOYED IMAGE MONITORING AND RELEVANT CHANGE DETECTION

BACKGROUND

The present invention relates to software image deployment, and more particularly to preventing loss of important information during new and updated software image deployment.

In the computerized world of today, it is common for computing devices, over time, to require installation of new or updated software. The process of installing or updating a software image on a computing device is often referred to as deploying the software image. The process of software deployment includes all of the activities that make a software image available for use. Generally, when a new software image is deployed to a computing device, the old software image is either totally uninstalled or overlaid by the new software image.

SUMMARY

As disclosed herein a method, executed by a computer, includes receiving, from a monitoring agent, a notification that an artifact corresponding to a deployed software image has been modified or the artifact has been referenced by a support application, and determining if the artifact is a relevant artifact and should be preserved. The method further includes determining an action corresponding to the relevant artifact to provide an identified action, and performing, prior to deploying a new software image, the identified action. A computer system, and a computer program product corresponding to the above method are also disclosed herein.

DETAILED DESCRIPTION

An immutable object is an object whose state should not be modified after it is created. Immutable image deployment is a concept of full replacement deployment, meaning that when changes are required for a software product (e.g., a software application, a software product, or a software operating system), the entire image is redeployed. Under the methodology of immutable image deployment, a patch or emergency fix to a software image should never be deployed as a partial image replacement (i.e., the patch or emergency fix would be deployed as a full replacement software image deployment).

When using immutable image deployment, with the exception of some configuration changes at deployment time, the same software image may be able to be deployed to all quality assurance (QA) environments (e.g., unit test and system test environments), pre-production environments, and the production environment. Deploying the same immutable software image in all environments may enable organizations to manage and maintain environments (e.g., development, test, and production environments) that are consistent and more conducive to defect reproduction and resolution.

Even though the concept of an immutable image may imply that nothing can change within the image, in a computing environment, various artifacts (e.g., files) within the deployed image (e.g., log files, javacore dump files, configuration files, and antivirus files) may be modified during normal operations. When a new immutable image (e.g., a fixpack for a product, or a new release of a product) is deployed, replacing the previously deployed image, all modified and unmodified artifacts corresponding to the previously deployed image may be deleted or replaced. The result may be a loss of key configuration information, key historical log data, key antivirus updates, and the like.

It has been determined that, prior to deploying a new immutable image, there is a need to preserve some of the modified information corresponding to a currently deployed software image. One method of identifying important artifacts that should be preserved is to have individuals manually identifying the important artifacts and manually saving them to a safe repository. This manual method is time consuming and prone to errors. The embodiments disclosed herein generally address the above-described problems.

Figure 1:
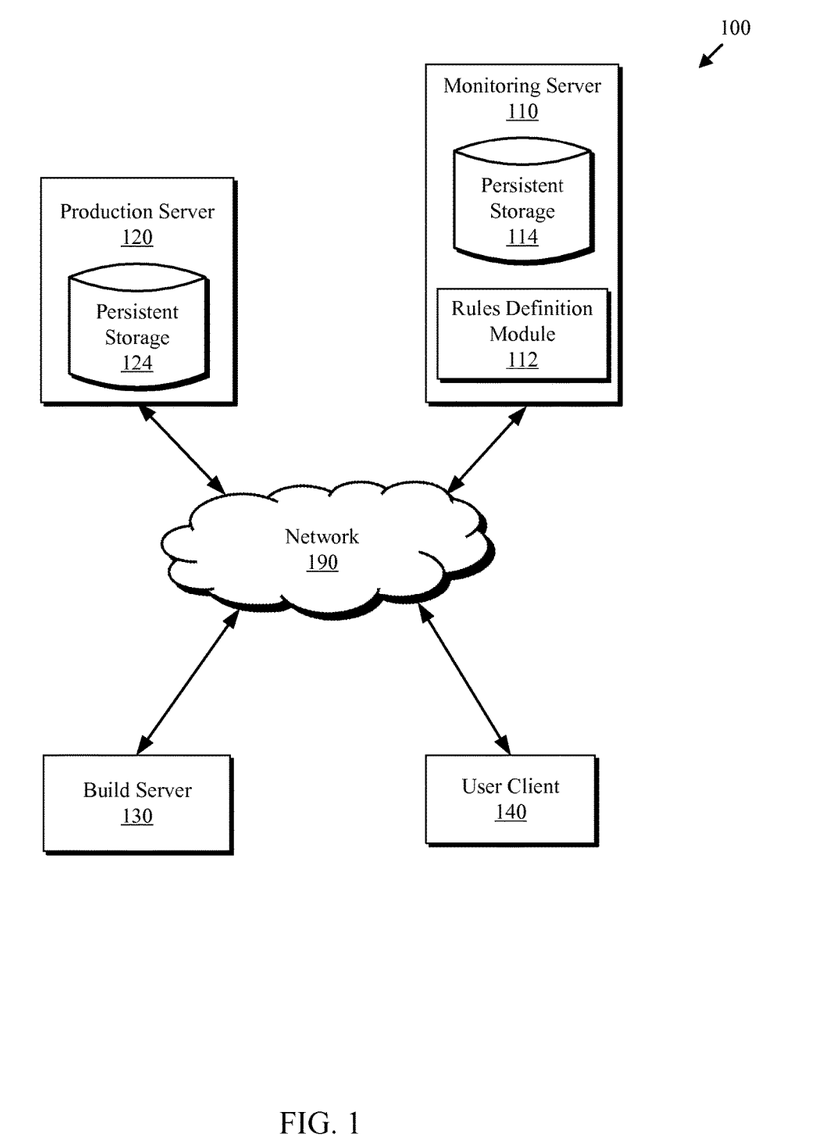
FIG. 1 is a functional block diagram depicting a computing environment in accordance with at least one embodiment of the present invention.

The present invention will now be described in detail with reference to the Figures. FIG. 1 is a functional block diagram depicting a computing environment 100 in accordance with at least one embodiment of the present invention. Computing environment 100 includes monitoring server 110, production server 120, build server 130, and user client 140 which can be smart phones, tablets, desktop computers, laptop computers, specialized computer servers, or any other computer systems, known in the art, capable of communicating over network 190. In some embodiments, monitoring server 110, production server 120, and build server 130 represent computer systems utilizing clustered computers and components to act as a single pool of seamless resources. In general monitoring server 110, production server 120, build server 130, and user client 140 are representative of any electronic devices, or combination of electronic devices, capable of executing machine-readable program instructions, as described in greater detail with regard to FIG. 4.

As depicted, monitoring server 110 includes rule definition module 112 and persistent storage 114. Rule definition module 112 may be configured to monitor a deployed immutable software image (hereinafter, a software image) for modifications to any files (e.g., artifacts) included in the software image. The monitoring operation may include receiving a notification from a monitoring agent that indicates an artifact corresponding to the software image has been either modified in some way, or has been referenced by a support application. For example, if during problem analysis, support asks to receive a specific file (e.g., a log file), a support ticket corresponding to the support application may identify the file being requested, and the monitoring agent may notify the monitoring operation of the referenced artifact.

Rule definition module 112 may also be configured to automatically generate a rule, corresponding to the identified artifact, that describes an action to be taken prior to deployment of a new software image (i.e., be for the currently deployed software image is deleted or overwritten by the new software image). Rule definition module 112 may add the generated rule to a collection of generated rules. The collection of generated rules may be saved on persistent storage 114 in flat files, databases, or any of various formats familiar to those of skill in the art.

Rule definition module 112 may also be configured to execute the generated rules and provide a comprehensive list of required actions corresponding to artifacts. In some embodiments, the comprehensive list of required actions includes artifacts that must be preserved (e.g., copied to a safe location that will not be affected by a deployment operation). In other embodiments, the comprehensive list of required actions includes email notifications to be sent to administrators including instructions and/or reminders of actions to be performed after the deployment operation is complete.

Build server 130 may generate and provide software images to be deployed in development and quality assurance (QA) environments (not shown). A software image that has been successfully tested on a QA environment my eventually be deployed on production server 120. The deploy operation may install the software image on persistent storage 124. Once the software image is successfully deployed, and activated, user client 140 may access production server 120 and the functionality provided by the software image.

In the depicted embodiment, monitoring server 110 and production server 120 are separate servers, however, in other embodiments, monitoring server 110 and production server 120 coexist on a single server. In yet other embodiments, monitoring server 110 and production server 120 are maintained on servers procured from a cloud environment.

Persistent storage 114 and 124 may be any non-volatile storage media known in the art. For example, persistent storage 114 and 124 can be implemented with a tape library, optical library, one or more independent hard disk drives, or multiple hard disk drives in a redundant array of independent disks (RAID). Similarly, data on persistent storage 114 and 124 may conform to any suitable storage architecture known in the art, such as a file, a relational database, an object-oriented database, and/or one or more tables.

Monitoring server 110, production server 120, build server 130, user client 140, and other electronic devices (not shown) communicate over network 190. Network 190 can be, for example, a local area network (LAN), a wide area network (WAN) such as the Internet, or a combination of the two, and include wired, wireless, or fiber optic connections. In general, network 190 can be any combination of connections and protocols that will support communications between monitoring server 110, production server 120, build server 130, and user client 140 in accordance with an embodiment of the present invention.

Figure 2A:
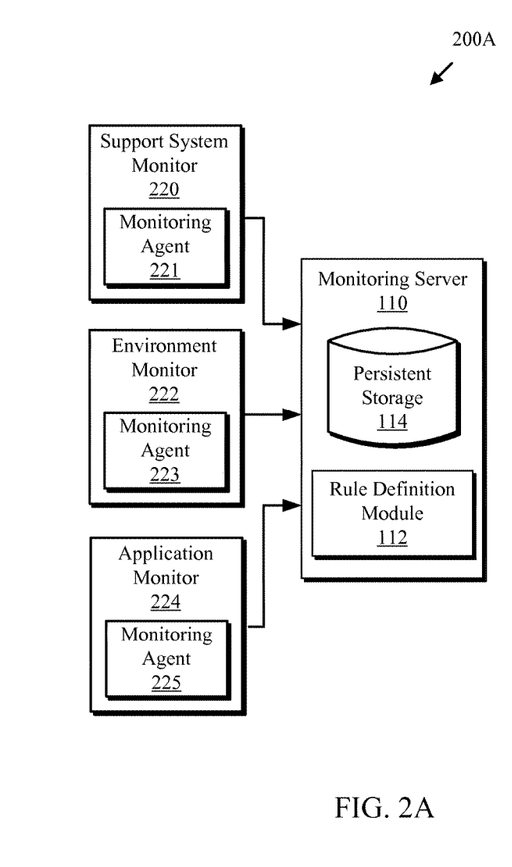
FIG. 2A is a functional block diagram depicting a computing system, in accordance with at least one embodiment of the present invention.

FIG. 2A is a functional block diagram depicting computing system 200A, in accordance with at least one embodiment of the present invention. As depicted, computing system 200A includes monitoring server 110, rule definition module 112, and persistent storage 114 as described in detail with regard to FIG. 1. Computing system 200A also includes support system monitor 220 and monitoring agent 221, environment monitor 222 and monitoring agent 223, and application monitor 224 and monitoring agent 225. The depicted monitors enable computing system 200A to detect modified artifacts, corresponding to a deployed software image.

When there are technical issues with a function provided by a deployed software image, a support team may be engaged. During problem analysis, the support team may request copies of log files, trace files, dump files, and the like. Many support organizations use support products (e.g., IBM® Support Assistant or Parature Customer Service™) to document and manage the actions of the support team. When the support team requires copies of artifacts (e.g., log files, trace files, dump files, and the like), the artifacts may be obtained by placing a request using the support products.

In some embodiments, the support products are installed on production server 120. In other embodiments, the support products are installed on support system monitor 220. Monitoring agent 221 is a computer agent (e.g., application or product), running on support system monitor 220, that detects requests for artifacts corresponding to the installed software image. Monitoring agent 221 may provide details of the requested artifacts to rule definition module 112.

When an updated software image is deployed, the previously deployed software image may be either removed or completely overlaid. After the deployment operation, modifications may be required to various configuration files to enable the newly deployed software image to become available for use. Additionally, during day to day operation of the deployed software image, various artifacts (i.e., log files, trace files, dump files, and the like) may be modified. Application monitor 224 may detect any modifications to artifacts in the deployed software image. Additionally, monitoring agent 225 may report to monitoring server 110 the detected modifications. Application monitor 224 and monitoring agent 225 continually monitor the deployed software image for activity that modifies any artifacts, and monitoring agent 225 continually reports modifications to monitoring server 110.

Additionally, environment monitor 222 also continually monitors the environment for modifications affecting the deployed software image. For example, environment monitor 222 may detect changes to database connection documents, files system permissions, antivirus automated updates, system configuration files, and the like. Monitoring agent 223 may report to monitoring server 110 any environmental modifications detected that may affect the deployed software image.

The exemplary embodiment depicts support system monitor 220, environment monitor 222, and application monitor 224 as separate computers. In other embodiments, monitoring server 110 includes support system monitor 220, environment monitor 222, and application monitor 224. In yet another embodiment, production server 120 includes support system monitor 220, environment monitor 222, and application monitor 224. In another embodiment, there are additional monitors and monitoring agents (not shown) reporting additional modifications to monitoring server 110.

Figure 2B:
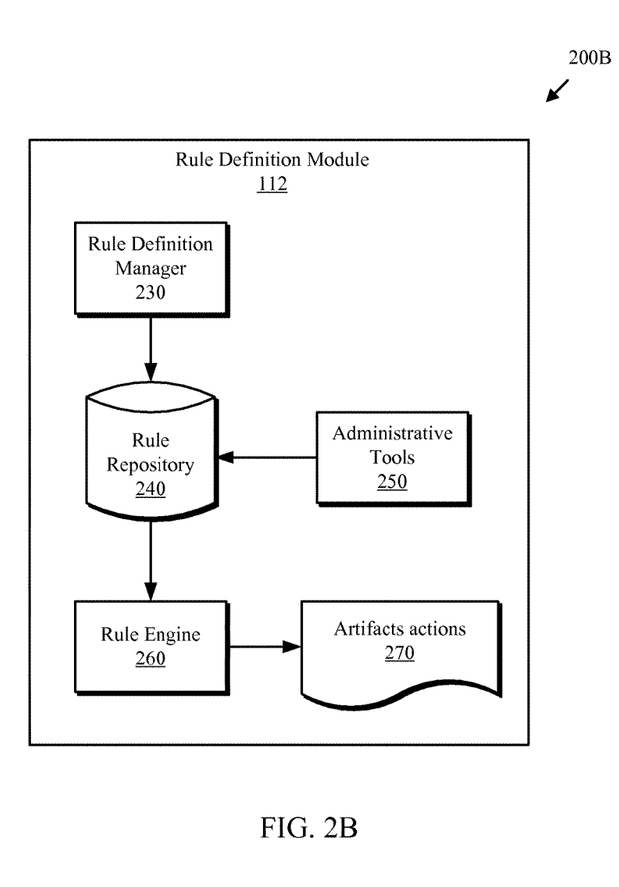
FIG. 2B is a functional block diagram depicting a rule definition module, in accordance with at least one embodiment of the present invention.

FIG. 2B is a functional block diagram depicting a rule definition module 200B, in accordance with at least one embodiment of the present invention. As depicted, rule definition module 200B includes rule definition module 112. Rule definition module 112 may receive, from monitoring agents 223, and/or 225 notifications that an artifact has been modified. Additionally, rule definition module 112 may receive, from monitoring agent 221, notifications that either a support organization or other stakeholder has requested an artifact (e.g., a log file, or dump file).

Rule definition manager 230 receives from monitoring agents (e.g., monitoring agents 221, 223, and 225) notifications of activity corresponding to an artifact. Rule definition manager 230 may determine if the modified artifact is a relevant artifact (i.e., an artifact of interest). If the artifact is determined to be a relevant artifact, then rule definition manager 230 may first determine if a rule corresponding to the relevant artifact exists in rule repository 240.

If a rule corresponding to the relevant artifact exists, then rule definition manager 230 may, based on extensive business logic or configuration settings, determine if the existing rule needs to be modified. If no rule corresponding to the relevant artifact exists, then rule definition manager 230 may, based on the extensive business logic or configuration settings, define a rule that identifies an action to be carried out corresponding to the relevant artifact. A newly defined rule may be stored in rule repository 240. In some embodiments, at predefined intervals, rule definition manager 112 parses through all active rules in rule repository 240 to confirm that each rule is still valid (e.g., has not expired). Any rule determined to be invalid or expired may be deleted or deactivated (e.g., disabled).

Rule repository 240 may conform to any suitable storage architecture known in the art, such as a file, a relational database, an object-oriented database, and/or one or more tables. Rule repository 240 may be any non-volatile storage media known in the art, such as, a tape library, optical library, one or more independent hard disk drives, or multiple hard disk drives in a redundant array of independent disks (RAID). In some embodiments, rule repository 240 is part of persistent storage 114. In other embodiments, rule repository 240 is maintained on persistent storage separate from persistent storage 114. In another embodiment, rule repository 240 is maintained in storage procured from a cloud computing environment.

A rule corresponding to the relevant artifact may describe one or more actions to be taken prior to deployment of a new software image. The actions corresponding to a rule may include, but are not limited to, preserving a relevant artifact (e.g., copying the artifact to a safe location), restoring the preserved relevant artifact after a new software image is deployed, generating an email notifying an administrator of required changes system changes (e.g., permission or ownership changes to the file system), and the like.

Using administrative tools 250, users with administrative privileges (i.e., administrative users) may also manually update or create rules. In general, administrative tools 250 may be a collection of administrative functions (e.g., tools), familiar to those of skill in the art, that enable an administrative user to create or modify rules. For example, if an application updates a general log file (e.g., app1_log.log) during normal application operations, then a rule may be automatically generated to preserver the modified app1_log.log. However, an administrative user may use administrative tools 250 to modify the rule such that app1_log.log will not be preserved unless the support organization or some other stakeholder has accessed app1_log.log within the last 60 days.

In some embodiments, an administrative user uses administrative tools 250 to control when a relevant artifact is preserved. Administrative tools 250 may be used to update an individual rule, corresponding to a relevant artifact, to specify a minimum duration during which the relevant artifact must have been accessed. In other embodiments, an administrative user uses administrative tools 250 to generate a global rule to indicate that any relevant artifact that is a log file (e.g., *.log) must have been accessed within the last 60 days to be preserved. As another example, an administrative user may disable (e.g., deactivate) a rule using administrative tools 250. In one embodiment, a flag is used to indicate a rule is deactivated. In another embodiment, a deactivated rule is removed (e.g., deleted) from rule repository 240.

Prior to deploying a new software image, rule engine 260 may retrieve each active rule from rule repository 240. Rule engine 260 may then provide artifact actions 270. In some embodiments, artifact actions 270 is a report indicating which artifacts must be preserved and which artifacts must be restored after a new software image has been deployed. In other embodiments, artifact actions 270 is one or more emails sent to an administrator identifying required modifications corresponding to relevant artifacts. In yet another embodiment, artifact actions 270 is an executable script that initiates actions to preserve relevant artifacts prior to a deployment activity, and then initiates restore actions to restore relevant artifacts after a new software image has been deployed.

Figure 3:
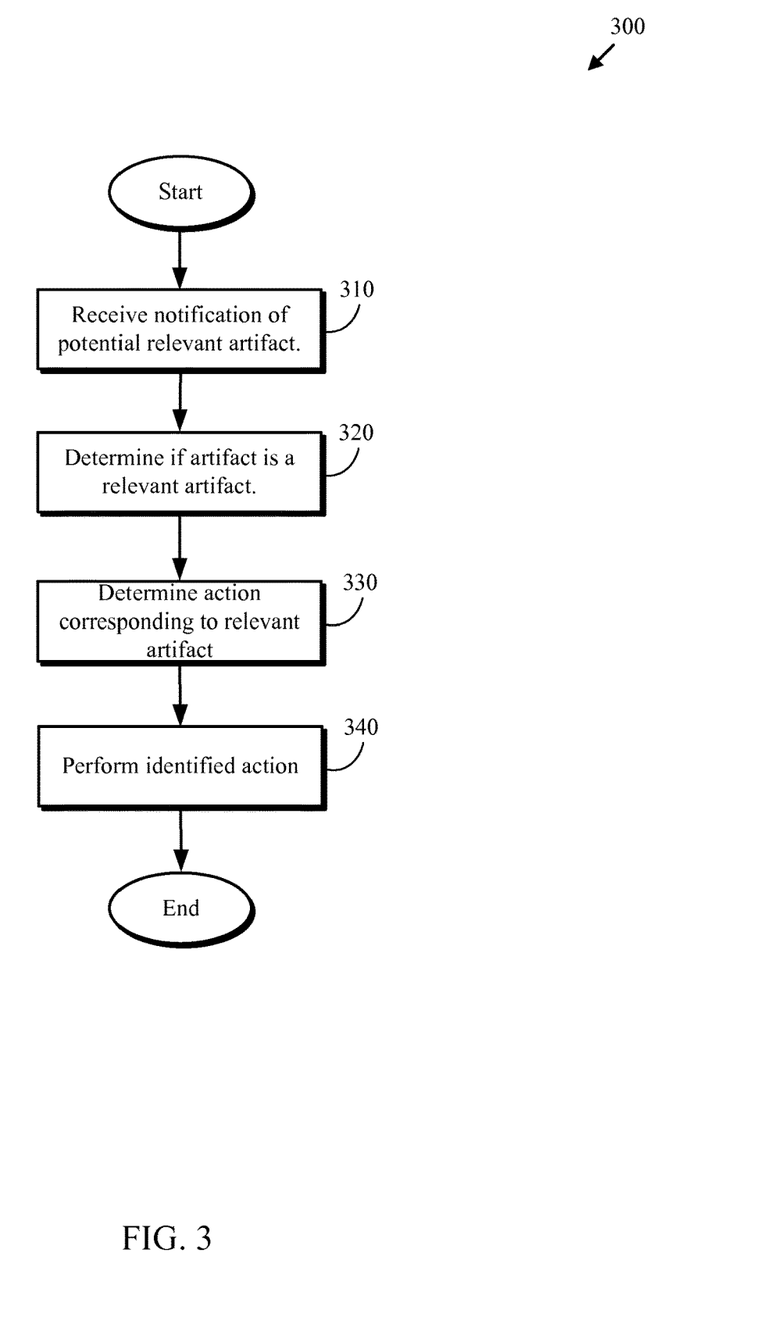
FIG. 3 is a flowchart depicting a rule definition method, in accordance with at least one embodiment of the present invention.

FIG. 3 is a flowchart depicting a rule definition method 300, in accordance with at least one embodiment of the present invention. As depicted, rule definition method 300 includes receiving (310) a notification of a potential relevant artifact, determining (320) if an artifact is relevant, determining (330) an action, and performing (340) the identified action. Rule definition method 300 enables automated identification of relevant artifacts. Additionally, rule definition method 300 enables automated generation of rules that comprise actions corresponding to preserving relevant artifacts across software image deployment operations.

Receiving (310) a notification of a potential relevant artifact may include rule definition module 112 receiving a notification from a monitoring agent (e.g., monitoring agents 221, 223, or 225). In some embodiments, the notification identifies an artifact that has been modified during operation of a monitored software image. In other embodiments, the notification identifies an environmental modification (e.g., antivirus updates) that affect the monitored software image. In yet another embodiment, the notification identifies an artifact that has been requested for analysis by a support tool or some other stakeholder tool.

Determining (320) if an artifact is relevant may include rule definition module 112 analyzing the artifact based on predetermined business rules. The predetermined business rules may be stored in the rule repository 240. In some embodiments, an administrator creates and modifies the predetermined business rules using administrative tools 250. In other embodiments, members of a development team create the predetermined business rules and store the predetermined business rules on persistent storage outside of rule definition module 112.

An artifact may be determined to be relevant if the artifact is, for example: (i) a modified diagnostic file requested by a support team or other stakeholders; (ii) an application specific configuration file or properties file that changes after a new software image is deployed; or (iii) a system setup or configuration file that changes after the new software image is deployed. If the artifact is determined to be relevant, rule definition method 300 processing continues with determining operation 330. Otherwise rule definition method 300 processing terminates.

Determining (330) an action may include rule definition module 112 using extensive business logic that defines the guidelines governing the generation of rules. In some embodiments, an administrator creates and modifies the extensive business logic using administrative tools 250. In other embodiments, application developers create the extensive business logic. The extensive business logic may be stored and maintained in rule repository 240.

Rule definition module 112 may parse through rule repository 240 to determine if a rule exists for the relevant artifact. If a rule exists, then rule definition module 112 may use the extensive business logic to analyze the existing rule and determine if the existing rule requires any modification as a result of the current notification. If no rule exists for the relevant artifact, then rule definition module 112 may the use the extensive business logic to identify an action and generate a new rule corresponding to the relevant artifact. The created or modified rule may be stored in rule repository 240.

Performing (340) the identified action may include rule definition module 112 initializing rule engine 260 to retrieve all active rules from rule repository 240. In some embodiments, each relevant artifact identified by a rule is preserved (e.g. copied to a safe location). In other embodiments, a report is generated that identifies each relevant artifact and a suggested action. In yet another embodiment, rule engine 260 sends an email to an administrator identifying required environmental modifications corresponding to a relevant artifact.

One of skill in the art will appreciate that an example of a relevant artifact may be an antivirus configuration file that is updated as a result of continual monitoring and preventive actions performed by antivirus software. Rule definition manager 230 may initially determine that the antivirus configuration file is a relevant artifact, and check rule repository 240 for an existing rule corresponding to the antivirus configuration file. If no rule exists, then rule definition manager 230 may identify an action to persist the antivirus configuration file. The action may be to preserve a copy of the antivirus configuration file in persistent storage that is not overlaid when the software image is redeployed. Once the action is identified, rule definition manager 230 may create a rule corresponding to the antivirus configuration file that identifies the action, and then store the rule in rule repository 240. The rule may include the actual copy command used to preserve the file.

Prior to redeploying the software image that is being monitored, rule engine 260 may execute the rule causing the identified action to be carried out (i.e., execute the copy command to preserve the antivirus configuration file). There may be and additional rule corresponding to the preserved antivirus configuration file that identifies an action to copy the preserved antivirus configuration file to the redeployed software image after the deploy operation has completed. As a result of this operation, a new software image is deployed, and the antivirus configuration file has been preserved and is available on the newly deployed software image.

Figure 4:
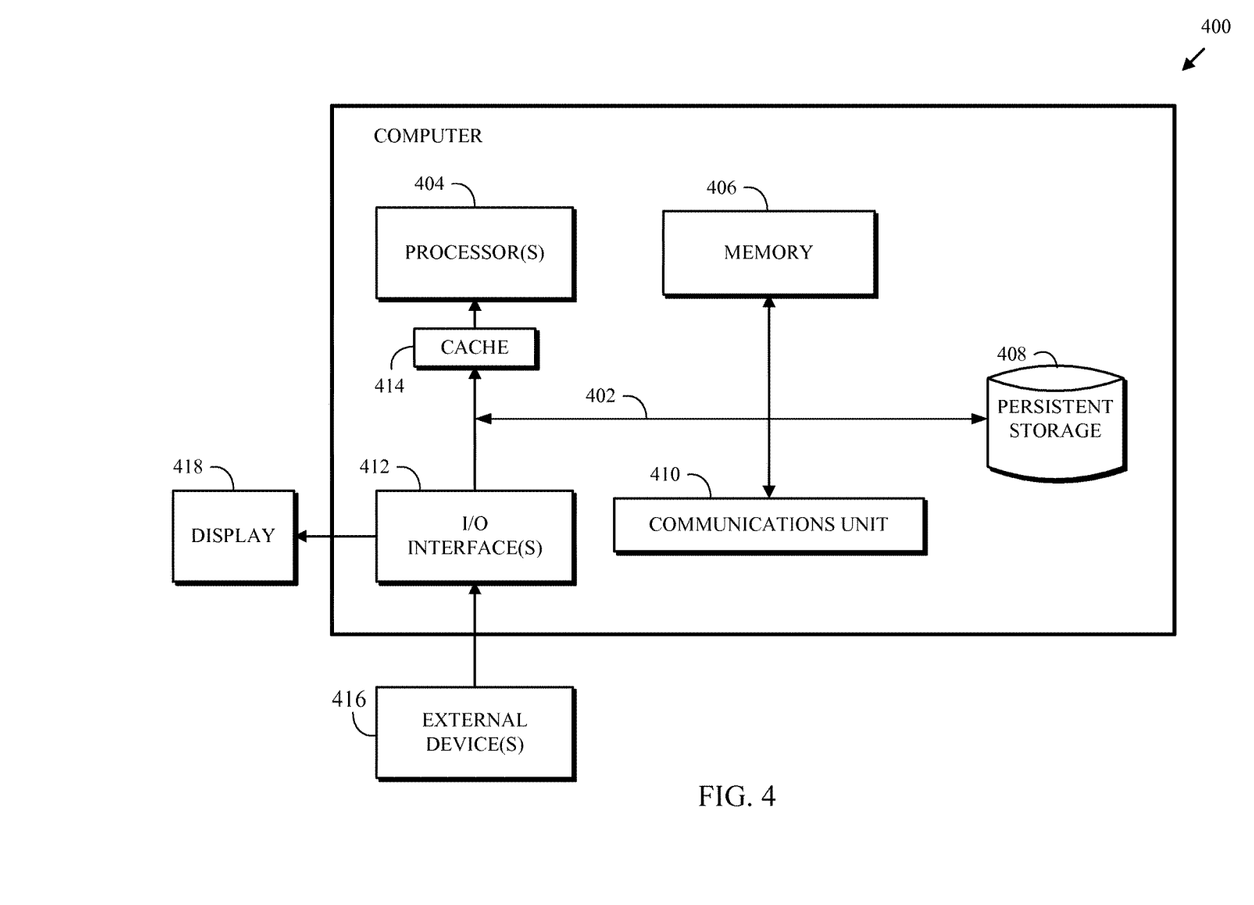
FIG. 4 is a functional block diagram depicting various components of one embodiment of a computer suitable for executing the methods disclosed herein.

FIG. 4 depicts a functional block diagram of components of a computer system 400, which is an example of systems such as monitoring server 110, production server 120, build server 130, and user client 140 within computing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Monitoring server 110, production server 120, build server 130, and user client 140 include processor(s) 404, cache 414, memory 406, persistent storage 408, communications unit 410, input/output (I/O) interface(s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention, e.g., rule definition method 300 are stored in persistent storage 408 for execution and/or access by one or more of the respective processor(s) 404 via cache 414. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of monitoring server 110, production server 120, build server 130, and user client 140. In these examples, communications unit 410 includes one or more network interface cards. Communications unit 410 may provide communications through the use of either or both physical and wireless communications links. Program instructions and data used to practice embodiments of rule definition method 300 may be downloaded to persistent storage 408 through communications unit 410.

I/O interface(s) 412 allows for input and output of data with other devices that may be connected to each computer system. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to a display 418.

Display 418 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   receiving, from a monitoring agent, a notification that an artifact corresponding to a deployed operating system image has been modified or the artifact has been referenced by a support application;

determining if the artifact is a relevant artifact and should be preserved, wherein determining if the artifact is a relevant artifact comprises determining if the artifact corresponds to a received modified diagnostic file corresponding to the deployed operating system image, wherein the modified diagnostic file is a log file that is updated during normal application operations, and wherein determining if the artifact is a relevant artifact further comprises determining if the artifact corresponds to at least one of:

an application specific configuration file or properties file corresponding to the deployed operating system image, wherein the application specific configuration file or properties file has been modified, or a system setup or configuration file corresponding to the deployed operating system image, wherein the system setup or configuration file has been modified;

responsive to determining that the artifact is a relevant artifact and should be preserved, determining if a rule corresponding to the relevant artifact exists, and if the rule should be modified or a new rule should be defined to correspond to the relevant artifact, wherein modifying an existing rule or defining a new rule includes identifying an action corresponding to the relevant artifact to deploy a new operating system image, wherein the identified action includes copying the relevant artifact prior to deploying the new operating system image; and deploying the new operating system image, wherein the relevant artifact is deployed with the new operating system image according to the identified action.

2. The method of claim 1, further comprising enabling an administrative user to modify a rule.

3. The method of claim 1, further comprising, determining that a rule has expired, and disabling the rule.

4. The method of claim 1, further comprising, storing a rule in a rule repository.

5. A computer program product comprising:

one or more computer readable storage media and program instructions stored on the one or more computer readable storage media, the program instructions comprising instructions to:

receiving, from a monitoring agent, a notification that an artifact corresponding to a deployed operating system image has been modified or the artifact has been referenced by a support application;

determining if the artifact is a relevant artifact and should be preserved, wherein determining if the artifact is a relevant artifact comprises determining if the artifact corresponds to a received modified diagnostic file corresponding to the deployed operating system image, wherein the modified diagnostic file is a log file that is updated during normal application operations, and wherein determining if the artifact is a relevant artifact further comprises determining if the artifact corresponds to at least one of:

an application specific configuration file or properties file corresponding to the deployed operating system image, wherein the application specific configuration file or properties file has been modified, or a system setup or configuration file corresponding to the deployed operating system image, wherein the system setup or configuration file has been modified;

responsive to determining that the artifact is a relevant artifact and should be preserved, determining if a rule corresponding to the relevant artifact exists, and if the rule should be modified or a new rule should be defined to correspond to the relevant artifact, wherein modifying an existing rule or defining a new rule includes identifying an action corresponding to the relevant artifact to deploy a new operating system image, wherein the identified action includes copying the relevant artifact prior to deploying the new operating system image; and deploying the new operating system image, wherein the relevant artifact is deployed with the new operating system image according to the identified action.

6. The computer program product of claim 5, wherein the program instructions include instructions to enable an administrative user to modify a rule.

7. The computer program product of claim 5, wherein the program instructions include instructions to determine that a rule has expired and to disable the rule.

8. The computer program product of claim 5, wherein the program instructions include instructions to store a rule in a rule repository.

9. A computer system comprising:

one or more computer processors;

one or more computer readable storage media;

program instructions stored on the computer readable storage media for execution by at least one of the computer processors, the program instructions comprising instructions to:

receiving, from a monitoring agent, a notification that an artifact corresponding to a deployed operating system image has been modified or the artifact has been referenced by a support application;

determining if the artifact is a relevant artifact and should be preserved, wherein determining if the artifact is a relevant artifact comprises determining if the artifact corresponds to a received modified diagnostic file corresponding to the deployed operating system image, wherein the modified diagnostic file is a log file that is updated during normal application operations, and wherein determining if the artifact is a relevant artifact further comprises determining if the artifact corresponds to least one of:

an application specific configuration file or properties file corresponding to the deployed operating system image, wherein the application specific configuration file or properties file has been modified, or a system setup or configuration file corresponding to the deployed software operating system image, wherein the system setup or configuration file has been modified;

responsive to determining that the artifact is a relevant artifact and should be preserved, determining if a rule corresponding to the relevant artifact exists, and if the rule should be modified or a new rule should be defined to correspond to the relevant artifact, wherein modifying an existing rule or defining a new rule includes identifying an action corresponding to the relevant artifact to deploy a new operating system image, wherein the identified action includes copying the relevant artifact prior to deploying the new operating system image; and deploying the new operating system image, wherein the relevant artifact is deployed with the new operating system image according to the identified action.

10. The computer system of claim 9, wherein the program instructions include instructions to enable an administrative user to modify a rule.

11. The computer system of claim 9, wherein the program instructions include instructions to determine that a rule has expired and to disable the rule.

\* \* \* \* \*